United States Patent [19]

Rubin et al.

[11] 4,021,447

[45] May 3, 1977

[54] SYNTHESIS OF ZEOLITE ZSM-4

[75] Inventors: Mae K. Rubin, Bala Cynwyd, Pa.; Charles J. Plank, Woodbury; Edward J. Rosinski, Pedricktown, both of N.J.

[73] Assignee: Mobil Oil Corporation, New York, N.Y.

[22] Filed: Apr. 30, 1975

[21] Appl. No.: 572,979

[52] U.S. Cl. .................. 260/326.8; 260/448 C; 260/567.6 M; 423/328; 423/329; 252/455 Z
[51] Int. Cl.$^2$ ............... C01B 33/28; C07D 295/00
[58] Field of Search ............... 423/328, 329; 260/448 C, 326.8, 567.6 R, 567.6 M; 252/455 Z

[56] References Cited

UNITED STATES PATENTS

| | | | |
|---|---|---|---|
| 2,531,427 | 11/1950 | Hauser | 260/448 C |
| 3,306,922 | 2/1967 | Barber et al. | 260/448 C |
| 3,642,434 | 2/1972 | Dwyer | 423/329 |
| 3,709,979 | 1/1973 | Chu | 423/328 |
| 3,849,463 | 11/1974 | Dwyer | 260/448 C |

FOREIGN PATENTS OR APPLICATIONS 1,117,568   6/1968   United Kingdom .............. 423/328

Primary Examiner—Edward J. Meros
Attorney, Agent, or Firm—Charles A. Huggett; Raymond W. Barclay; Claude E. Setliff

[57] ABSTRACT

As synthesized by previous methods, ZSM-4 zeolites are crystallized in the presence of substantial amounts of a tetramethylammonium hydroxide or halide. When synthesized in this way, they contain the tetramethylammonium cation as well as a metal cation such as sodium. To obtain a more catalytically active form, the sodium ion must be exchanged to very low levels. Catalysts prepared in this manner have been found to be quite low in stability. By synthesizing these zeolites in the presence of pyrrolidine or choline salts, ZSM-4 having a different organic nitrogen containing cation but the same crystal structure as previously prepared ZSM-4 is obtained. Catalysts made therefrom are, surprisingly, much more stable than those prepared from ZSM-4 made by previous methods.

9 Claims, No Drawings

SYNTHESIS OF ZEOLITE ZSM-4

BACKGROUND OF THE INVENTION

1. Field of the Invention

The invention relates to a new form of ZSM-4, to a process for preparing it and to a method for using it in hydrocarbon conversion reactions. More particularly, it relates to making and using ZSM-4 which, in its synthesized form, has a different nitrogen-containing cation, but the same crystal structure as previously synthesized ZSM-4.

2. Summary of the Prior Art

ZSM-4 is a relatively new zeolite which in its previously synthesized aluminosilicate form has the following composition expressed in terms of mole ratios of oxides:

$$0.9 \pm 0.2 \, M_2O : Al_2O_3 : 3\text{-}20 \, SiO_2 : 0\text{-}20 \, H_2O$$

wherein M is selected from the group consisting of a mixture of tetramethylammonium cations and alkali metal cations, especially sodium. ZSM-4 has a distinctive X-ray diffraction pattern which further identifies it from other known zeolites. The original alkali metal cations of ZSM-4 can be exchanged by ion exchange with other ions to form species of the zeolite which have exceptional catalytic properties especially in those hydrocarbon conversion reactions which do not involve any heat transfer.

SUMMARY OF THE INVENTION

In accordance with the invention there is provided a new form of ZSM-4 having the following formula in terms of mole ratios of oxides:

$$1.0 \pm 0.3 \, R_2O : Al_2O_3 : 3\text{-}20 \, SiO_2$$

on an anhydrous basis wherein R is a mixture of alkali metal cations and nitrogen-containing cations derived from choline salts or pyrrolidone. The original cations can be present so that the amount of nitrogen-containing cations is between 1 and 50 percent of the total amount of original cations. Thus, the zeolite can be expressed by the following, in terms of mole ratios of oxides:

$$1.0 \pm 0.3 \, [xM_2O + (1-x)R_2O] : Al_2O_3 : 3\text{-}20 \, SiO_2$$

on an anhydrous basis wherein R is derived from choline or its salts or pyrrolidone, M is an alkali metal and x is between about 0.10 and about 0.80. The invention also provides a process for preparing the ZSM-4 and a method for using it in hydrocarbon conversion reactions.

DESCRIPTION OF SPECIFIC EMBODIMENTS

In the prior art, ZSM-4 has been prepared by forming a mixture of alumina, silica, sodium oxide, water and tetraethylammonium compounds such that the mixture has a composition, in terms of mole ratios of oxides, falling within the following ranges:

| | Broad | Preferred | Most Preferred |
|---|---|---|---|
| $\dfrac{OH^-}{SiO_2}$ | 0.1–1.8 | 0.3–1.6 | 0.3–1.0 |
| $\dfrac{R_4N^+}{(R_4N^+ + M^+)}$ | 0.01–0.98 | 0.01–0.7 | 0.5–0.7 |
| $H_2O$ | 5–300 | 7.5–300 | 10–75 |
| $\dfrac{OH^-}{SiO_2}$ | 3–60 | 3–60 | 6–30 |
| $\dfrac{}{Al_2O_3}$ | | | | wherein $R_4N^+$ is tetramethylammonium cation. The mixture is maintained under conditions of temperatures and pressure until crystals are formed which crystals are separated and recovered.

Members of the family of ZSM-4 zeolites possess a definite distinguishing crystalline structure whose X-ray diffraction pattern has the following values:

TABLE A

| Interplanar Spacing d(A) | Relative Intensity |
|---|---|
| 9.1 ± .2 | VS |
| 7.94 ± .1 | MW |
| 6.90 ± .1 | M |
| 5.97 ± .07 | S |
| 5.50 ± .05 | MW |
| 5.27 ± .05 | MW |
| 4.71 ± .05 | MW |
| 4.39 ± .05 | W |
| 3.96 ± .05 | W |
| 3.80 ± .05 | S |
| 3.71 ± .05 | M |
| 3.63 ± .05 | M |
| 3.52 ± .05 | S |
| 3.44 ± .05 | M |
| 3.16 ± .05 | S |
| 3.09 ± .05 | M |
| 3.04 ± .05 | M |
| 2.98 ± .05 | M |
| 2.92 ± .05 | S |

These values were determined by standard techniques. The radiation was the K-alpha doublet of copper, and a Geiger Counter spectrometer with a strip chart pen recorder was used. The peak heights, I, and the positions as a function of 2 times theta, where theta is the Bragg angle, were read from the spectrometer chart. From these, the relative intensities, $100 \, I/I_o$, where $I_o$ is the intensity of the strongest line or peak, and d(obs.), the interplanar spacing in A, corresponding to the recorded lines, were calculated. In Table A, the relative intensities are given in terms of the symbols VS=very strong, S=strong, M=medium, W=weak and MW=medium weak. It should be understood that this X-ray diffraction pattern is characteristic of all the species of ZSM-4 composition. When the sodium ion is ion exchanged with another cation, X-ray reveals substantially the same pattern with some minor shifts in interplanar spacing and variation in relative intensity. This is also true when the as-synthesized ZSM-4 contains an organic nitrogen-containing ion different from tetramethylammonium.

In a preferred method of preparing a ZSM-4 crystalline aluminosilicate zeolite in accordance with the present invention, the crystallization environment is prepared and into the crystallization environment is introduced a mixture comprising alkali metal, alumina, silica, choline salts or pyrrolidine and water having the following ratios, expressed in terms of mole ratios of oxides:

| | |
|---|---|
| $\dfrac{OH^-}{SiO_2}$ | 0.3–0.82 |

| | |
|---|---|
| $\dfrac{R^+}{(R^+ + M^+)}$ | 0.2–0.8 |
| $\dfrac{H_2O}{OH^-}$ | 20–100 |
| $\dfrac{SiO_2}{Al_2O_3}$ | 10–75 | wherein $R^+$ is the ion from choline salts [(2-hydroxyethyl) trimethylammonium salts] or the ion from pyrolidone and M is alkali metal. The reaction mixture is maintained until crystals of the aluminosilicate are formed. The crystals are separated from the supernatant liquid and recovered. Generally, it is desired to thereafter wash the crystals until the filtrate washings stabilize at a pH below about 11.

This mixture is maintained at reaction conditions until the crystals of the zeolite are formed. Thereafter the crystals are separated from the liquid and recovered. Typical reaction conditions consist of a temperature of from about 75° C to 175° C for a period of about 6 hours to 60 days. A more preferred temperature range is from about 90° C to about 150° C, with the amount of time at a temperature in such range being from about 12 hours to 20 days.

The composition can be prepared utilizing materials which supply the elements of the appropriate oxide. Such compositions include sodium aluminate, alumina, sodium silicate, silica hydrosol, silica gel, silicic acid, sodium hydroxide and the appropriate nitrogen compound. It will be understood that each oxide component utilized in the reaction mixture for preparing ZSM-4 can be supplied by one or more initial reactants and they can be mixed together in any order. For example, sodium oxide can be supplied by an aqueous solution of sodium silicate; the organonitrogen cation is supplied by choline salts, e.g. choline chloride, or pyrrolidine. The reaction mixture can be prepared either batchwise or continuously. Crystal size and crystallization time of the ZSM-4 composition will vary with the nature of the reaction mixture employed.

The ZSM-4 zeolite produced by the method of the present invention has, as has already been stated, the same X-ray diffraction as previously prepared ZSM-4. The product can also be expressed in terms of mole ratios of oxides as set forth hereinabove in the Summary.

In determining the amounts of reactants to use, the ZSM-4 zeolite will be obtained if the respective mole ratios of oxides are maintained in the ranges specified hereinabove.

ZSM-4 synthesized by the present method is useful as a cracking and hydrocracking catalyst as well as a catalyst for olefin polymerization and isomerization and paraffin isomerization and disproportionation. However, in order to increase the range and stability of ZSM-4, it is necessary to remove the original metal ion, usually sodium. The original metal of most zeolites can be removed by conventional exchange procedures, as by multiple exchanges, i.e. one exchange followed by another. Some zeolites, ZSM-4 included, are not susceptible to this method of exchange, the sodium content reaching a plateau and remaining there regardless of the number of additional exchanges. It has been previously discovered that calcination of the zeolite by removing the tetramethylammonium ion "frees" the sodium so it can thereafter be removed easily. Typical replacing cations include hydrogen, ammonium and metal cations, including mixtures of the same. Of the replacing cations, particular preference is given to cations of hydrogen, ammonium, rare earth, magnesium, zinc, calcium, nickel, and mixtures thereof, generally employed in the form of their salts, preferably the chlorides, nitrates or sulfates. This precalcination is not necessary, although it may still be used to facilitate removal of the sodium cation by means of ion exchange from the products of this invention.

Representative, more detailed ion exchange techniques are disclosed in a wide variety of patents, including U.S. Pat. Nos. 3,410,249, 3,140,251, 3,140,253 and 3,702,886.

Following contact with the salt solution of the desired replacing cation, the zeolites prepared in accordance with this invention may be washed with water and dried at a temperature ranging from 150° F to about 600° F and thereafter may be heated in air or other inert gas at temperatures ranging from about 500° F to 1500° F for periods of time ranging from 1 to 48 hours or more. The zeolites thus produced and treated are also useful as cracking catalyst in cracking, hydrocracking, M-forming and dewaxing operation.

It is also possible to treat the zeolite with steam at elevated temperatures ranging from 800° F to 1600° F and preferably 1000° F and 1500° F, if such is desired. The treatment may be accomplished in atmospheres consisting partially or entirely of steam.

A similar treatment can be accomplished at lower temperatures and elevated pressures, e.g. 350°–700° F at 10 to about 200 atmospheres.

The ZSM-4 produced by the method of this invention may be used in a porous matrix. The zeolites can be combined, dispersed or otherwise intimately admixed with a porous matrix in such proportions that the resulting product contains from 1% to 95% by weight, and preferably from 1 to 70% by weight of the zeolite in the final composite.

The term porous matrix includes inorganic compositions with which the aluminosilicates can be combined, dispersed or otherwise intimately admixed wherein the matrix may be active or inactive. It is to be understood that the porosity of the compositions employed as a matrix can either be inherent in the particular material or it can be introduced by mechanical or chemical means. Inorganic compositions, especially those of a siliceous nature, are preferred. Of these matrices inorganic oxides such as clay, chemically treated clay, alumina, silica, silica-alumina, etc. are particularly preferred because of their superior porosity, attrition resistance, and stability. More preferably, alumina is the matrix, and it is preferably combined with the zeolite prior to calcination.

Techniques for incorporating the zeolites in a matrix are conventional in the art and are set forth in U.S. Letters Pat. No. 3,140,249.

The following Examples serve to illustrate the scope of the invention showing that ZSM-4 type crystalline aluminosilicate containing very low levels or organic nitrogen can be made by various techniques. It will be understood that the Examples are not intended in any way to place a limitation on the invention.

Having described the invention in general terms, the following is offered as illustrations.

EXAMPLE 1

This Example illustrates the heretofore conventional process used in making ZSM-4 employed herein as a standard for comparison. "Parts" in all the Examples are by weight:

| Silicate Solution | |
|---|---|
| 174.4 parts | 50% NaOH |
| 298.0 parts | Water |
| 34.4 parts | TMACl (50% solution) Tetramthylammonium chloride |
| 652 parts | Q-Brand silicate (28.9 wt % SiO$_2$) (8.9 wt % Na$_2$O) (62.2 wt % H$_2$O) |
| Sp. Gr. 1.299 at 73° F | |
| Acid Solution | |
| 119.3 parts | Al$_2$(SO$_4$)$_3$ . 14 H$_2$O  MW 595 |
| 33.7 parts | H$_2$SO$_4$ (98%) |
| 276.2 parts | Water |
| Sp. Gr. 1.235 at 75° F | |

These solutions were mixed continuously through a nozzle flowing the silicate solution at 5820 cc/min and the acid-alum solution at 2010 cc/min. This mix was charged to a steam jacketed vessel and held at about 210°–214° F for 69 hours during which time the ZSM-4 product was formed. The product was then filtered and washed free of soluble components. The product composition at this point was 18.1 wt % Al$_2$O$_3$, 72.4 wt % SiO$_2$ and 7.6 wt % Na, (SiO$_2$/Al$_2$O$_3$ = 6.8).

Table 1 summarizes the reagents and conditions used in preparing ZSM-4 by the process of this invention. As shown in the table, synthesis of the ZSM-4 employs sodium silicate (28.8% SiO$_2$, 8.9% Na$_2$O, 62% H$_2$O), colloidal SiO$_2$ (30% SiO$_2$, 70% H$_2$O), aluminum sulfate, sodium aluminate (NaAlO$_2$: 43.1% Al$_2$O$_3$, 33.1% Na$_2$O, 24.3% H$_2$O), H$_2$SO$_4$, NaOH, choline chloride [(2-hydroxyethyl) trimethylammonium chloride] - Examples 2-6- and pyrrolidine - Example 7-10. The amounts of these specific components are given for each example.

In making each product (of Example 2-10) the A, B and C solutions were prepared separately, mixed together and stirred vigorously for from 15 to 20 minutes before heating. Crystallization was carried out in a sealed plastic jar at static conditions and atmospheric pressure. The crystalline products were separated from the reaction mixture by filtering and washing with water until the zeolite was substantially free of anion.

Table 1

| Preparation of ZSM-4 from Choline Chloride | | | |
|---|---|---|---|
| Example No. | 2 | 3 | 4 |
| Starting Materials (parts) | | | |
| A. Silicate Solution | | | |
| Sodium Silicate | 101.6 | 101.6 | 0 |
| 50% NaOH Solution | 22.0 | 26.2 | 0 |
| H$_2$O | 19.8 | 19.8 | 0 |
| Colloidal SiO$_2$ | 0 | 0 | 250 |
| B. Al$_2$(SO$_4$)$_3$ . 18 H$_2$O | 19.4 | 9.72 | 0 |
| H$_2$SO$_4$ | 2.0 | 6.5 | 0 |
| NaAlO$_2$ | 0 | 0 | 10.0 |
| H$_2$O | 174 | 174 | 60.0 |
| C. Choline Chloride | 18.0 | 27.0 | 109 |
| H$_2$O | 40.0 | 40.0 | 120 |
| NaOH | 0 | 0 | 31.9 |
| Starting Gel Composition (molar ratio) | | | |
| SiO$_2$ | 16.8 | 33.5 | 30.0 |
| $\frac{Al_2O_3}{R^+}$ (1) | 0.27 | 0.34 | 0.45 |
| $\frac{(R^+ + M^+)}{OH^-}$ | 0.72 | 0.82 | 0.73 |
| $\frac{SiO_2}{H_2O}$ | 48.6 | 43.0 | 22.1 |
| $\frac{OH^-}{}$ | | | |
| Crystallization Conditions | | | |
| Temp., ° F | 210 | 210 | 210 |
| Time, Days | 23 | 21 | 186 |
| X-Ray analysis (2) | ZSM-4 105% | ZSM-4 95% | ZSM-4 125% |
| Product Composition (molar ratio) | | | |
| Al$_2$O$_3$ | 1.00 | 1.00 | 1.00 |
| SiO$_2$ | 7.60 | 8.00 | 9.62 |
| Na$_2$O | 0.87 | 0.83 | 0.81 |
| N (3) | 0.59 | 0.62 | 0.80 |
| C | 3.15 | — | 4.68 |

| Example No. | 5 | 6 |
|---|---|---|
| Starting Materials (parts) | | |
| A. Silicate Solution | | |
| Sodium Silicate | 101.6 | 81.2 |
| 50% NaOH Solution | 22.0 | 20.9 |
| H$_2$O | 0 | 15.8 |
| Colloidal SiO$_2$ | 0 | 0 |
| B. Al$_2$(SO$_4$)$_3$ . 18 H$_2$O | 19.4 | 15.5 |
| H$_2$SO$_4$ | 6.5 | 5.2 |
| NaAlO$_2$ | 0 | 0 |
| H$_2$O | 174 | 139 |
| C. Choline Chloride | 36.0 | 28.8 |
| H$_2$O | 0 | 0 |
| NaOH | 0 | 0 |
| Starting Gel Composition (molar ratio) | | |
| SiO$_2$ | 16.8 | 16.8 |
| $\frac{Al_2O_3}{R^+}$ (1) | 0.46 | 0.45 |
| $\frac{(R^+ + M^+)}{OH^-}$ | 0.64 | 0.65 |
| $\frac{SiO_2}{H_2O}$ | 55.0 | 46.8 |
| $\frac{OH^-}{}$ | | |
| Crystallization Conditions | | |
| Temp., ° F | 210 | 210 |
| Time, Days | 61 | 63 |
| X-Ray Analysis (2) | ZSM-4 100% | ZSM-4 100% |
| Product Composition (molar ratio) | | |
| Al$_2$O$_3$ | 1.0 | 1.0 |
| SiO$_2$ | 8.3 | 8.6 |
| Na$_2$O | 0.64 | 0.68 |
| N (3) | 0.64 | 0.70 |
| C | — | — |

| Preparation of ZSM-4 from Pyrrolidine | | |
|---|---|---|
| Example No. | 7 | 8 |
| Starting Materials (parts) | | |
| A. Silicate Solution | | |
| Sodium Silicate | 203.2 | 0 |
| 50% NaOH Solution | 26.0 | 7.22 |
| H$_2$O | 120 | 0 |
| Colloidal SiO$_2$ | 0 | 72.0 |
| B. Al$_2$(SO$_4$)$_3$ . 18 H$_2$O | 38.8 | 0 |
| H$_2$SO$_4$ | 9.0 | 0 |
| NaAlO$_2$ | 0 | 5.0 |
| H$_2$O | 348 | 174 |
| C. Pyrrolidine | 71.0 | 26.2 |
| Starting Gel Composition (molar ratio) | | |
| SiO$_2$ | 16.8 | 17.1 |
| $\frac{Al_2O_3}{R^+}$ (1) | 0.72 | 0.72 |
| $\frac{(R^+ + M^+)}{OH^-}$ | 0.39 | 0.40 |
| $\frac{SiO_2}{H_2O}$ | 87.6 | 88.4 |
| $\frac{OH^-}{}$ | | |
| Crystallization Conditions | | |
| Temp., ° F | 210 | 210 |
| Time, Days | 38 | 65 |
| X-Ray Analysis (2) | ZSM-4 105% | ZSM-4 125% |
| Product Composition (molar ratio) | | |
| Al$_2$O$_3$ | 1.00 | 1.00 |
| SiO$_2$ | 10.0 | 12.5 |
| Na$_2$O | 0.60 | 0.22 |
| N (3) | 0.82 | 1.68 |
| C | — | 4.46 |

Table 1-continued

| Example No. | 9 | 10 |
|---|---|---|
| Starting Materials (parts) | | |
| A. Silicate Solution | | |
|    Sodium Silicate | 203.2 | 101.6 |
|    50% NaOH Solution | 26.0 | 13.0 |
|    $H_2O$ | 120 | 60.0 |
|    Colloidal $SiO_2$ | 0 | 0 |
| B. $Al_2(SO_4)_3 \cdot 18\,H_2O$ | 19.4 | 4.8 |
|    $H_2SO_4$ | 9.0 | 4.5 |
|    $NaAlO_2$ | 0 | 0 |
|    $H_2O$ | 348 | 174 |
| C. Pyrrolidine | 71.0 | 35.0 |
| Starting Gel Composition (molar ratio) | | |
| $SiO_2/Al_2O_3$ | 33.5 | 67.7 |
| $R^{+\,(1)}/(R^+ + M^+)$ | 0.64 | 0.61 |
| $OH^-/SiO_2$ | 0.57 | 0.66 |
| $H_2O/OH^-$ | 75.0 | 52.6 |
| Crystallization Conditions | | |
|    Temp., °F | 210 | 210 |
|    Time, Days | 30 | 28 |
| X-Ray Analysis (2) | ZSM-4 115% | ZSM-4 120% |
| Product Composition (molar ratio) | | |
|    $Al_2O_3$ | 1.00 | 1.00 |
|    $SiO_2$ | 9.7 | 8.93 |
|    $Na_2O$ | 0.41 | 0.65 |
|    N (3) | 1.42 | 0.72 |
|    C | 2.94 | — |

(1) $R^+$ is the N-containing ion; M is sodium.
(2) Changes in relative intensities of some of the X-ray lines.
(3) Moles of $R_2O$ is ½ of this value.

EXAMPLE 11

A portion of the material of Example 7 was subjected to 5 one-hour base exchanges with a 10% aqueous solution of ammonium chloride. The exchange was done at 190° F with stirring. The sample was not calcined prior to base exchange. After filtering, washing and drying, the zeolite had 0.02% by weight of sodium.

EXAMPLE 12

In a manner similar to that described in Example 11, a sample of the product from Example 8 was calcined, except that, prior to exchange, the sample was calcined for 10 hours at 1000° F and the exchange temperature was 180° F. The ZSM-4 had <0.01% by weight of sodium.

EXAMPLE 13

A sample of Example 6 product was treated as described in Example 12, except that the base exchange temperature was 185° F – 194° F. The zeolite contained less than 0.01% by weight of sodium.

EXAMPLE 14

A portion of the Example 1 product which was the conventional ZSM-4 made with tetramethylammonium chloride, was subjected to 6 two-hour base exchanges with a 10% aqueous solution of ammonium chloride. The exchange was done at 180° F while stirring. There was no calcination to exchange, and the sodium content of the final product was 0.05% by weight.

EXAMPLE 15

A sample of the product of Example 4 (an example of the present invention) was exchanged, without prior calcination, as otherwise described in Example 13. The sodium content of the exchanged product was 0.03% by weight.

EXAMPLE 16

A portion of the Example 5 product (another example of the present invention) was treated as described in Example 15. The sodium content of the exchanged sample was 0.02% by weight.

EVALUATION OF PRODUCTS

The exchanged, washed and dried products of Examples 14, 15 and 16 were calcined and tested in the hexane cracking test (alpha activity test) Table 2 shows the results after calcination.

Table 2

| Example No. | Temp. Calcined °F | Time Calcined Mins. | Temp. of Alpha-Test °F | Alpha Value |
|---|---|---|---|---|
| 14 | 1000 | 5 | 700 | 648 |
|  |  | 25 | 700 | 102 |
|  | 1200 | 5 | 700 | 10.6 |
|  |  | 25 | 700 | 7.3 |
| 15 | 1000 | 5 | 700 | 2149 |
|  |  | 25 | 700 | 335 |
|  | 1200 | 5 | 700 | 1959 |
|  |  | 25 | 700 | 331 |
| 16 | 1000 | 5 | 700 | 984 |
|  |  | 25 | 700 | 232 |
|  | 1200 | 5 | 700 | 621 |
|  |  | 25 | 700 | 196 |

As shown in Example 11–13 and 15–16, ZSM-4 prepared by the method of this invention can be exchanged to sodium levels almost as low without precalcination as with precalcination. Furthermore, the alpha activity test data on Examples 14, 15 and 16 show a remarkable increase in stability of the products of the present invention (Examples 15 and 16) after the 1200° F calcination compared to conventional ZSM-4 (Example 14).

Results of work done on the ZSM-4 showed that such ZSM-4 did not obtain occluded silica. This was confirmed by treatment of a sample of ZSM-4 with 2 wt. % of NaOH solution for 4 hours at 180° F, which showed the silica to be an integral part of the zeolite structure.

We claim:
1. A synthetic crystalline aluminosilicate zeolite having a composition as synthesized in terms of moles of oxides as follows:

$$1.0 \pm 0.3\ R_2O : Al_2O_3 : 3\text{-}20\ SiO_2$$

on an anhydrous basis, wherein R is a mixture of alkali metal cations and nitrogen-containing cations derived from a member of the group consisting of choline, choline salts and pyrrolidine and having the X-ray powder diffraction pattern as set forth in Table A.

2. The zeolite of claim 1 having a composition in terms of mole ratios of oxides as follows:

$$1.0 \pm 0.3\ [xM_2O + (1-x)R_2O] : Al_2O_3 : 3\text{-}20\ SiO_2$$

on an anhydrous basis, wherein R is derived from a member of the group consisting of choline, choline salts and pyrrolidone, M is an alkali metal and $x$ is from about 0.10 to about 0.80.

3. The zeolite of claim 2 wherein M is sodium and R is derived from choline chloride.

4. The zeolite of claim 2 wherein M is sodium and R is derived from pyrrolidone.

5. In a method for synthesizing a ZSM-4 crystalline aluminosilicate zeolite containing an organic nitrogen cation, wherein a reaction mixture comprising sources of silica, alumina, alkali metal, water and organonitrogen cation precursor is prepared and maintained under conditions of temperature and pressure to effect crystallization of said zeolite, the improvement wherein said precursor is derived from a member of the group consisting of choline, choline salts and pyrrolidine.

6. The method of claim 5 wherein the crystallization temperature is from about 75° C to about 175° C.

7. The method of claim 5 wherein the precursor is choline chloride.

8. The method of claim 5 wherein the precursor is pyrrolidine.

9. The method of claim 5 wherein all ingredients used to form the ZSM-4 were mixed and vigorously stirred prior to heating.

* * * * *